United States Patent [19]

Whitehouse

[11] Patent Number: 5,315,501
[45] Date of Patent: May 24, 1994

[54] POWER TOOL COMPENSATOR FOR TORQUE OVERSHOOT

[75] Inventor: Hugh L. Whitehouse, Lyndhurst, Ohio

[73] Assignee: The Stanley Works, New Britain, Conn.

[21] Appl. No.: 863,054

[22] Filed: Apr. 3, 1992

[51] Int. Cl.$^5$ .............................................. G05B 13/02
[52] U.S. Cl. ...................... 364/152; 364/153; 364/508; 73/862.23; 81/467; 173/176; 173/181
[58] Field of Search ...................... 364/152, 153, 508; 73/862.21, 862.23; 81/467, 470; 173/176, 181, 182

[56] References Cited

U.S. PATENT DOCUMENTS

| | | | |
|---|---|---|---|
| 2,867,117 | 1/1959 | Ernst | 73/139 |
| 3,768,573 | 10/1976 | Jennings | 173/12 |
| 3,796,131 | 3/1974 | Workman et al. | 91/1 |
| 3,821,991 | 7/1974 | Alexander | 173/12 |
| 3,973,434 | 8/1976 | Smith | 364/152 |
| 4,006,784 | 2/1977 | Dudek | 173/12 |
| 4,016,938 | 4/1977 | Rice | 173/182 |
| 4,106,176 | 8/1978 | Rice et al. | 173/182 |
| 4,106,570 | 8/1978 | Eshghy et al. | 173/12 |
| 4,179,786 | 12/1979 | Eshghy | 29/407 |
| 4,294,110 | 10/1981 | Whitehouse | 73/862.23 |
| 4,305,471 | 12/1981 | Eshghy | 173/12 |
| 4,375,122 | 3/1983 | Sigmuno | 364/508 |
| 4,620,450 | 11/1986 | Yamaguchi | 73/862.23 |
| 4,639,996 | 2/1987 | Fullmer | 81/470 |
| 4,685,050 | 8/1987 | Polzer et al. | 364/152 |
| 4,894,767 | 1/1990 | Doniwa | 364/153 |
| 4,903,783 | 2/1990 | Rushanan et al. | 173/12 |
| 4,995,145 | 2/1991 | Eshghy | 73/862.23 |
| 5,154,242 | 10/1992 | Soshin et al. | 173/178 |

FOREIGN PATENT DOCUMENTS

| | | |
|---|---|---|
| 2006963 | 5/1979 | United Kingdom . |
| 2199163 | 5/1988 | United Kingdom . |
| 2229550 | 9/1990 | United Kingdom . |

OTHER PUBLICATIONS

*A Primer On Setting Threaded Fasteners* by Hugh L. Whitehouse, May 25, 1991.

Primary Examiner—Jerry Smith
Assistant Examiner—Paul Gordon
Attorney, Agent, or Firm—Hayes & Reinsmith

[57] ABSTRACT

A system and method for compensating for torque overshoot in a rotary power tool wherein the tool is shut off at an adjusted set point value of torque which is below the target value of torque by the amount of torque overshoot. While the tool is operated to perform a fastening job, the relationship between the torque rate in the fastening job to overshoot in the tool is determined, the torque rate in the job is monitored while the tool is setting the job, and the torque set point is adjusted while the tool is setting the job to compensate for the torque overshoot determined from the foregoing relationship. The relationship between torque rate in the fastening job and overshoot in the tool follows the expression $Y=K/X$ where Y is the overshoot, X is the deceleration time required to tighten the fastener and K is a constant determined by using the measured deceleration time and torque overshoot during a previous high torque rate job in the foregoing expression, the deceleration time being measured between the same selected fractional values of the target torque. During a subsequent fastening job, the deceleration time is measured between the same selected fractional values of target torque, the overshoot is calculated from the foregoing mathematical expression using the previous value of K, and the torque set point is adjusted to compensate for the calculated value of overshoot. The foregoing is performed job-to-job developing a running average of the constant K. While the use of torque-time rates is preferred for simplicity and economy, the use of torque-angle rates also is contemplated.

23 Claims, 6 Drawing Sheets

POWER TOOL COMPENSATOR FOR TORQUE OVERSHOOT

BACKGROUND OF THE INVENTION

This invention relates to rotary power tools and, more particularly, to a new and improved control system and method to compensate for torque overshoot in such tools.

One area of use of this invention is in tightening threaded fasteners, although the principles of the present invention can be variously applied. In a typical power tool system to which the present invention relates, the fastening tool contains a torque transducer connected to a microprocessor-meter combination. In such a controlled tool, an analog torque signal is fed from the torque transducer in the tool to the microprocessor-meter in which a torque target has been set. When that target is reached, a control signal is sent from the meter to shut off the tool. In a fluid operated tool the shut off mechanism may be a solenoid-actuated valve in the tool. On an electric tool, shut off may be accomplished through an electronic switch. On a high torque-rate threaded joint, inertia in the decelerating high-speed elements in the tool can potentially drive the final tool torque well beyond the stall torque of the tool, and shut off or braking mechanisms cannot react quickly enough to prevent torque overshoot above the target torque set on the meter.

One way to correct the foregoing problem is to measure the amount of overshoot and adjust the set point on the meter downward so that the overshoot brings the final torque up to the target torque. Some presently available controls have built-in circuits to make this adjustment automatically, in effect learning the proper compensating set point after a few runs. The problem with this approach is that the torque rate of fastening jobs is seldom uniform, so that the amount of overshoot varies. A control which has learned to lower the set point from previous runs on high torque-rate jobs will yield a low final torque when the torque rate of the next job is suddenly low.

It would, therefore, be highly desirable to provide a system and method to compensate for torque overshoot which teaches the control the dynamic character of the power tool in use, in particular finding the curve, i.e., a mathematical function, which relates torque rate in the particular fastening job to overshoot in the tool. Then inspection or monitoring the torque rate of a job is effected while the tool is actually setting the job so that the torque set point can be lowered in precisely the correct amount to compensate for the overshoot related to that torque rate.

SUMMARY OF THE INVENTION

Therefore, a primary object of this invention is to provide a new and improved system and method to compensate for torque overshoot in rotary power tools.

A further object of this invention is to provide such a system and method which enables the tool to learn from actual fastening job runs and to automatically adjust so that the tool itself observes the fastening event while it is happening and makes corrections to compensate for torque overshoot during a fastening job.

A more particular object of this invention is to provide such a system and method which compensates for torque overshoot in a manner accommodating random events in power fastening jobs.

Another object of this invention is to provide such a system and method which is readily adaptable to existing power tool arrangements.

This invention provides a system and method for compensating for torque overshoot in a rotary power tool wherein the tool is shut off at a set point value of torque which is equal to or less than the target value of torque depending upon the amount of torque overshoot and wherein the torque set point is adjusted in the following manner.

While the tool is operated to perform a fastening job, the relationship between the torque rate in the fastening job to overshoot in the tool is determined, the torque rate in the job is monitored while the tool is setting the job, and the torque set point is adjusted while the tool is setting the job to compensate for the torque overshoot determined from the foregoing relationship. The relationship between torque rate in the fastening job and overshoot in the tool follows the mathematical expression $Y = K/X$ where Y is the torque overshoot, X is the deceleration time required to tighten the fastener and K is a constant which is determined by using the measured deceleration time and torque overshoot during a previous high torque rate job in the foregoing expression, the deceleration time being measured between the same selected fractional values of the target torque. During a subsequent fastening job, the deceleration time is measured between the same selected fractional values of target torque, the overshoot is calculated from the foregoing mathematical expression using the previously determined value of K, and the torque set point is adjusted to compensate for the calculated value of overshoot. The foregoing is performed job-to-job in a manner developing a running average of the constant K. While the use of torque time rates is preferred for simplicity and economy, the use of torque-angle rate is included within the scope of this invention.

The foregoing and additional advantages and characterizing features of this invention will be clearly apparent upon a reading of the ensuing detailed description together with the included drawing figures.

DETAILED DESCRIPTION OF THE ILLUSTRATED EMBODIMENTS

Figure 1:
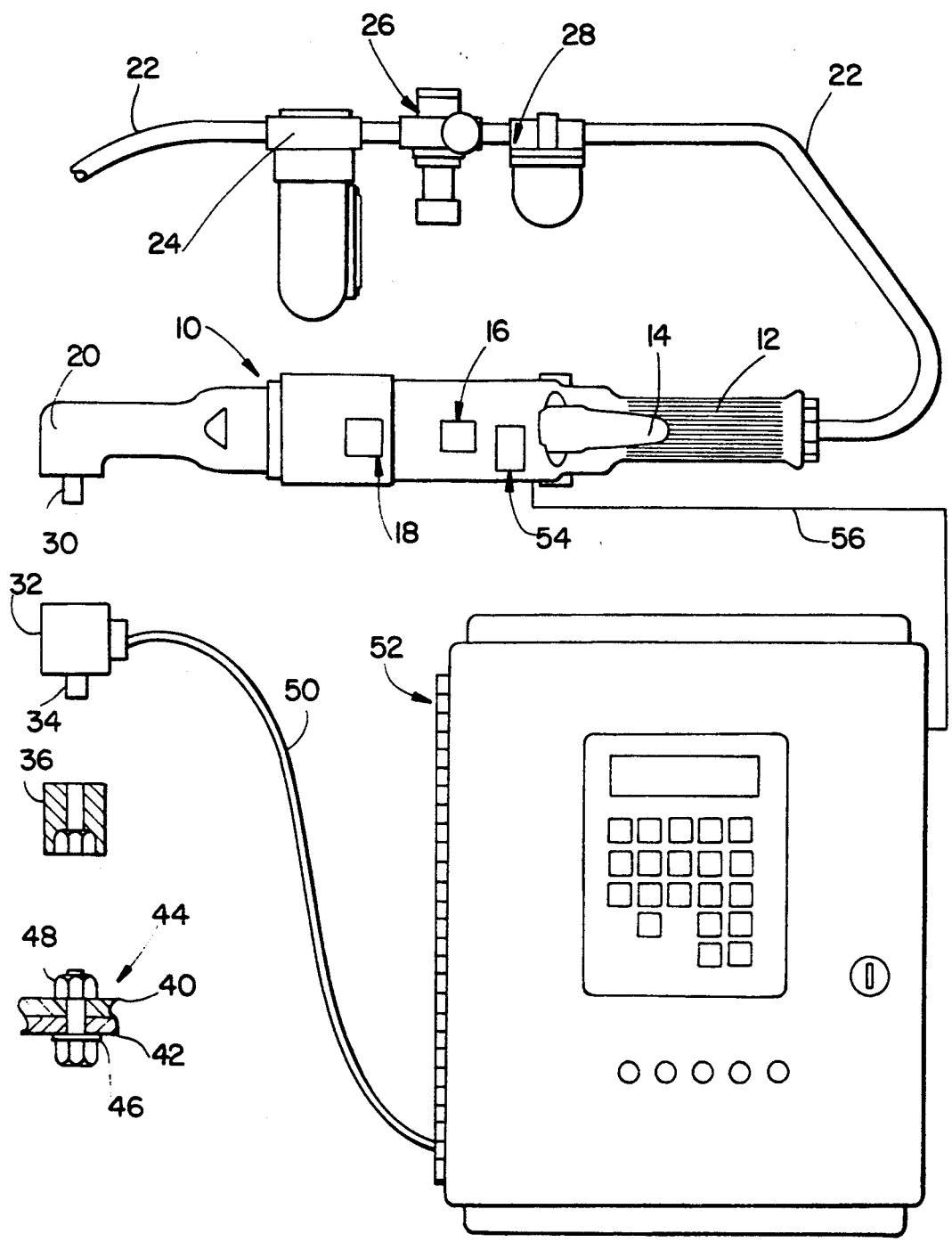
FIG. 1 is a schematic diagram illustrating a fluid operated power tool and torque monitoring arrangement utilizing the system and method according to this invention for compensating for torque overshoot.

FIG. 1 illustrates a fluid-operated power tool and torque monitoring arrangement utilizing the system and method according to this invention for compensating for torque overshoot. The present invention is equally applicable to electric tools as will be explained in further detail below. The power tool 10 shown is a rotary power tool for use in setting screws, nuts and other threaded fasteners. Typically, an air fastening tool comprises a hand grip 12, control switch operator 14, high speed multiple vane motor 16, gear reduction 18 to reduce speed and increase torque, and an output drive 20 to connect to a fastener. Operating fluid such as compressed air is supplied from a suitable source (not shown) to motor 16 through a supply line 22 in which a filter 24, regulator valve 26 and lubricator 28 are connected in a manner well-known to those skilled in the art. The output drive 20 is provided with a key 30 for connection to the socket of a torque transducer 32 which in turn, is provided with a key 34 for connection to a socket 36 for application to a fastener for tightening the same. In other words, socket 36 is driven directly to tool output drive 20 through the direct coupling provided by transducer 32.

FIG. 1 also illustrates a typical fastening job wherein sheets 40, 42 of a workpiece are joined by a fastener 44 comprising threaded bolt 46 and nut 48, the latter fitting within socket 36 in a known manner. The output of transducer 32 is connected by line 50 to the input of a microprocessor-meter combination 52 which is described in further detail below. Tool 10 also includes a solenoid-operated shut off valve 54 in a known manner, and the output of the microprocessor of combination 52 is connected by line 56 to valve 54 for controlling the same in a manner which will be described. Those skilled in the art will recognize that FIG. 1 could also be an electrically-driven tool with an electronic shut off switch, in the tool or remote from it, in place of the solenoid-operated shut off valve; that the transducer could be built into the tool; that the tool could be fixtured rather than hand-held; and that such fixtured tools could be mounted singly or in multiple arrays.

In the operation of the arrangement of FIG. 1 to tighten a fastener such as that designated 44, an analog torque signal from transducer 32 is applied to the input of microprocessor-meter combination 52 in which a torque target value has been set. When that target is reached, a control signal is sent from combination 52 to valve 54 via line 56, shutting off tool 10 at the target torque. For a more detailed description of the structure and operation of a fluid-operated power tool having a solenoid-operated shut off tool, reference may be made to U.S. Pat. No. 4,903,783 dated Feb. 27, 1990 entitled "Solenoid Controlled Air Tool", and assigned to the assignee of this invention, the disclosure of which is hereby incorporated by reference.

On a high torque-rate threaded joint, inertia in the decelerating high-speed elements in tool 10 can potentially drive the final tool torque well beyond the stall torque of the tool, and the solenoid-operated valve 54 cannot react quickly enough nor is natural internal braking sufficient to prevent torque overshoot above the target torque set on the meter 52. One way to correct this problem is to measure the amount of overshoot and adjust the set point on the meter downward so that the overshoot brings the final torque up to the target torque, and some prior art controls make this adjustment automatically, in effect learning the proper compensating set point after a few runs. As previously mentioned, the torque rate of fastening jobs is seldom uniform with the result that the amount of overshoot varies, so a control which has learned to lower the set point from previous runs on high torque-rate jobs will yield an unacceptably low final torque when the torque rate of the next job is suddenly low.

Figure 2:
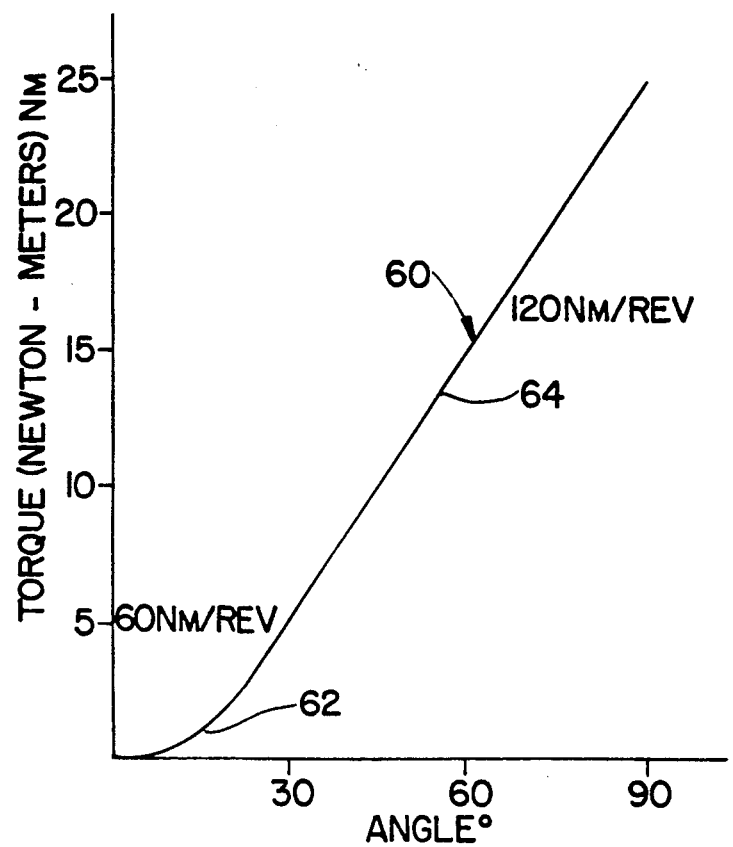
FIG. 2 is a graph showing typical torque vs. angle of turn while setting a threaded fastener.

Torque rate in a fastening job is defined as the number of torque units increase per revolution, for example 30 Newton meters (Nm) increase per revolution, or simply 30 Nm/rev. FIG. 2 is a typical torque vs. angle plot 60 while setting a threaded fastener showing non-linear torque rate 62 during pull-up, followed by linear torque rate 64. In particular, a free running bolt has no torque rate, and when the head of the bolt meets the work, torque may increase 25 Newton-meters, for example in 90 degrees of turn, or in $\frac{1}{4}$ of a revolution, as in FIG. 2. The torque rate of the job would then be 100 Newton-meters per revolution. In practice, however, torque rate is seldom constant, particularly at the start of a job, where components are first being pulled together. In the example of FIG. 2, torque may have reached 5 Newton-meters in the first 30 degrees, 15 Newton-meters in the next 30 degrees, and 25 Newton-meters in the last 30 degrees. The torque rate, then, in the first 30 degrees would be 60 Newton-meters per revolution; in the second 30 degrees where the torque increased from 5 to 15 Newton-meters, the torque rate would be 120 Newton-meters per revolution; in the last 30 degrees, where the torque increased from 15 to 25 Newton-meters, the torque rate would continue at 120 Newton-meters per revolution. One way to classify the torque rate of a job is to ignore the changing torque rate. Another way to classify the torque rate of a job is to ignore the angle of turn until one-half the final torque is reached, and then measure the torque rate from the halfway point to the final torque. This method eliminates the most variable part of the tightening cycle, but may be misleading in trying to apply tools to jobs. Fastening jobs typically have an increasing torque rate during initial pull-up, caused by low torque-rate elastic and plastic deformation in the parts being clamped. When these irregularities are flattened out, torque rate becomes steeper and linear, reflecting the linear elasticity of the fastener itself, sometimes including linear yield of the clamped pieces.

Where pull-up takes only a small percentage of the target torque, followed by a steep linear climb, a job is classified as a hard job. Where the pull-up at low torque rate takes a sizeable percentage of the target torque, a job is classified as a soft job. A job may be very hard or very soft, or at a torque rate anywhere in between. Jobs which go linearly from 5% or so of target torque to 100% of target torque in 30 degrees represent the practical limit of job hardness found in production threaded fastening jobs.

On most high torque-rate jobs there is an initial lower-rate non-linear period while the clamped parts undergo elastic and plastic deformation, followed by a steep linear climb to the desired levels similar to that illustrated by curve 60 in FIG. 2. It has been determined, according to the present invention, that on a given tool at a given inlet pressure the torque-angle slope can be correlated to the overshoot. That is to say, a torque rate of 10 Nm/rev. may cause a 5% overshoot, and 20 Nm/rev. may cause 15%. Overshoot may be significant on hard jobs, negligible on soft jobs.

Torque-angle analysis typically employs an angle encoder in a tool. However, there is no reason the relationship of torque vs. time cannot be used, thereby eliminating the need for an encoder. Using this approach, one would start measuring time at some low torque in the linear part of the torque-angle rate, say 25% of the target torque set on the meter. Then one would stop measuring at 75% of target torque say, and compare that measured time with the amount of overshoot. If that exact time (in milliseconds) is seen, i.e. detected, from 25% to 75% on the next fastener, the set point is lowered quickly to shut the tool off at a low torque, and the overshoot is allowed to carry the tool and fastener up to the target torque. A key issue then arises as to what to do when the time is shorter or longer.

Figure 3:
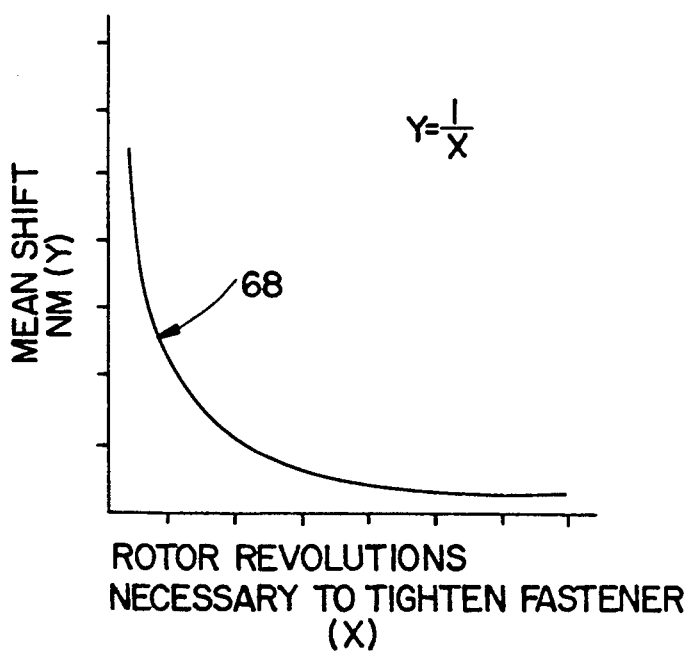
FIG. 3 is a graph illustrating an inverse relationship between torque overshoot and rate of deceleration caused by torque build-up and utilized by this invention.

The present invention utilizes the relationship, determined from calculation and inspection, that overshoot is inversely proportional to the rate of deceleration caused by torque build-up. The shorter the time of deceleration the higher the mean shift, i.e. the overshoot. This follows the simple mathematical expression of $Y=K/X$, or $K=XY$, where Y is the overshoot, X is the deceleration time required to tighten the fastener, and K is a constant. In FIG. 3 curve 68 illustrates mean shift or overshoot as a function of the number of tool rotor revolutions necessary to tighten the fastener. As previously noted the angular quantity rotor revolutions can be replaced with time on the linear portion of the torque rate curve. FIG. 3 further illustrates that when tool rotor revolutions from loose to tight are few, mean shift or overshoot is high. Small differences in torque rate in hard jobs make large differences in mean shift or overshoot.

The constant K in the expression $Y=K/X$ is determined by using the measured deceleration time and torque overshoot during a previous high torque rate job in the expression, the deceleration time being measured between selected fractional values of the target torque. For example, applying this to the time from 25% to 75% of target and the overshoot already found in running one high torque-rate job and multiplying the two together, provides the K of the above expression. On a subsequent job one can again find the time from 25% to 75% of target torque, and divide it into K to find the overshoot to be compensated. Since there are always random elements in power fastening, there has to be some ongoing averaging of K. In addition, since overshoot becomes very small as deceleration time increases, it is necessary to ignore all time readings over a certain value.

The method of this invention may be summarized briefly as follows. While the tool 10 is operated to perform a fastening job, in particular a hard job, the relationship between the torque rate in the fastening job to overshoot in the tool is determined, the torque rate in the job is monitored while the tool is setting the job, and the torque set point is adjusted while the tool is setting the job to compensate for the torque overshoot determined from the aforementioned relationship between torque rate and overshoot. The relationship between torque rate in the fastening job and overshoot in the tool follows the mathematical expression $Y=K/X$ previously described. The constant K is determined by using the measured deceleration time X and torque overshoot Y during a high torque rate job in the expression, the deceleration time being measured between selected fractional values of the target torque. During a subsequent fastening job, the deceleration time is measured between the same selected fractional values of target torque, the overshoot is calculated from the foregoing mathematical expression using the previously determined value of K, and the torque set point is adjusted to compensate for the calculated value of overshoot. The foregoing is performed job-to-job in a manner developing a running average of the constant K.

Figure 4:
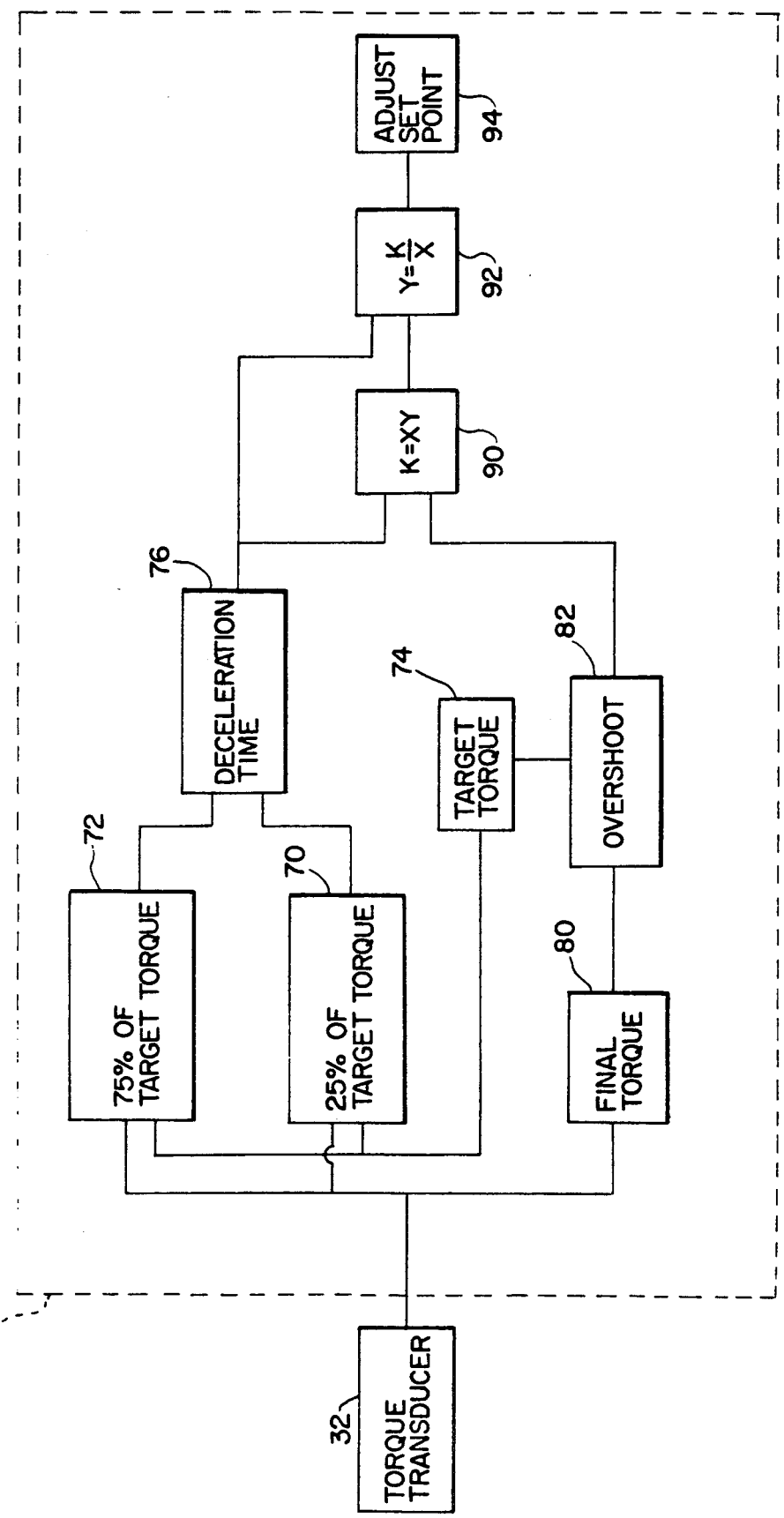
FIG. 4 is a structure chart of a program for carrying out this invention.

Advantageously, overshoot compensation according to this invention is accomplished by the relatively simple arrangement of FIG. 1 requiring only the torque transducer 32 and the programmed microprocessor-meter of combination 52. The system of this invention is illustrated in FIG. 4 which is a structure chart of the principal modules in the portion of a typical program in the microprocessor of combination 52 for carrying out this invention. The instantaneous torque obtained from transducer 32 is applied as an input to each of the program modules 70 and 72 which determines the time at which the selected fractional values of target torque occur, for example 25% and 75%, respectively, in the present illustration. In this connection, another module 74 which contains the target torque set on the meter applies that target torque to another input of modules 70 and 72. The outputs of modules 70 and 72 are applied to the inputs of a module 76 which computes the deceleration time between the selected fractional values of target torque, i.e., the quantity X in the relationship $K=XY$.

The instantaneous torque obtained from transducer 32 also is applied as an input to a module 80 which determines the final or peak torque during the fastening job, and this is applied as an input to a module 82, which also receives an input from target torque module 74, which module 82 determines the torque overshoot, i.e., the quantity Y in the relationship $K=XY$.

The outputs of modules 76 and 82 are applied to the inputs of a module 90 which computes the constant K according to the relationship $K=XY$. The value of K is then used for calculating overshoot on subsequent runs to adjust the torque set point as previously described. In particular, the output module 90, i.e., the value of K, is applied as one input to a module 92 which calculates overshoot according to the relationship $Y=K/X$. The other input to module 92 is the deceleration time X which is obtained from the module 76. The output of module 92, i.e., the calculated value of overshoot Y, is applied to the input of a module 94 which adjusts the torque set point on the meter to compensate for the calculated value of overshoot.

As previously mentioned, it is necessary to ignore all time readings over a certain number of milliseconds, because overshoot gets very small as time increases. When overshoot becomes small it becomes lost in the random torque scatter inherent in all power fastening. A torque reading one percent over target may occur with a 25% to 75% time of 30 milliseconds, and it may also occur at a 25% to 75% time of 300 milliseconds. If K is calculated at 300 ms, and the next run yields 30 ms from 25% to 75% of target, the meter 52 would automatically reduce the set point to compensate for 10% overshoot (300 ms times 1%=3; 30 ms times 10%=3). For practical purposes, according to a preferred mode of this invention, omitting all runs yielding more than 30 ms prevents this leveraging of the effects of small random scatter into the $K=XY$ curve.

A more detailed description of the method of this invention now follows. First, microprocessor-meter 52 is set to establish its set point at the target torque, and tool 10 is run on a fastening job. The next step is to measure the time elapsed between selected fractional values of target torque, for example, from 25% to 75% of the target torque. As previously described, this normally is on the linear portion of the torque rate curve, and other percentages ranges, i.e. 30-50, 35-60 etc. can be employed. This measured time is designated $X_1$. According to a preferred mode of this invention, if this measured time or any other measured time X is greater than 30 ms, overshoot compensation is not performed and this fastening run is omitted from the method.

The next step is to subtract the target torque from the measured torque to find the overshoot and this quantity is designated $Y_1$. In the following step, the deceleration time $X_1$ and overshoot $Y_1$ are multiplied together to obtain the value of the constant $K_1$.

Next, the tool 10 is run on a second fastening job and while the tool is running, the next three steps are performed to compensate for overshoot. In particular, first, the deceleration time is measured from 25% to 75% of target torque and this is designated $X_2$. Next $K_1$ from the first fastening job is divided by the measured time $X_2$ from the second job to determine a value of predicted overshoot on this job. This predicted overshoot is designated $Y_{2p}$. This step is defined mathematically by the expression $Y_{2p} = K_1/X_2$. In the final step in this portion of the method, first the predicted overshoot $Y_{2p}$ is added to the target torque. This quantity then is divided into the square of the target torque. The result is the new torque set point, i.e., the set point on meter of combination 52 is reduced to this value. In particular, the new set point $S_2$ is defined by the relationship:

$$S_2 = [(\text{Target})/(\text{Target} + Y_{2p})](\text{Target}).$$

The next portion of the method deals with establishing a running average of the constant K. In order to establish such an average K, the first step is to calculate the actual overshoot $Y_{2a}$ on a previous run. In particular, the measured torque $M_2$ is divided by the set torque $S_2$. The result then is multiplied by the target torque, and from that result the target torque is subtracted. This yields the actual overshoot $Y_{2a}$ on a previous run. To summarize, $$Y_{2a} = (M_2/S_2)(\text{Target}) - \text{Target}.$$

Next, the actual overshoot on the previous run is multiplied by the measured time on the previous run to find the next value of K. In other words, $Y_{2a}$ is multiplied by $X_2$ to find $K_2$. Next $K_2$ is subtracted from $K_1$ and 15% of this difference is added to $K_1$ to obtain the new value of K, i.e., $K_{2a}$. Summarizing, $$K_{2a} = (K_2 - K_1)(0.15) + K_1.$$

The next six steps are a repeat of the previous six steps to illustrate a running average for K. In particular, the tool 10 is run on a third job and the time elapsed from 25% to 75% of a target torque is measured and this is called $X_3$. Next, the previously determined value $K_{2a}$ is divided by $X_3$ to find a predicted overshoot $Y_{3p}$. Summarizing, $Y_{3p} = K_{2a}/X_3$. Next, a new torque set point $S_3$ is obtained as before from the relationship:

$$S_3 = [(\text{Target})/(\text{Target} + Y_{3p})](\text{Target})$$

The set point on microprocessor-meter 52 is reduced to this value. The next step is to calculate as before the actual overshoot $Y_{3a}$ on a previous run using the relationship:

$$Y_{3a} = (M_3/S_3)(\text{Target}) - \text{Target}$$

The next value of K is found as before by multiplying the actual overshoot on the previous run by the measured time on the previous run, i.e., $(X_{3a})(X_3) = K_3$. Finally, the new value of K is determined as before from the relationship:

$$K_{3a} = (K_3 - K_{2a})(0.15) + K_{2a}$$

Figure 5A:
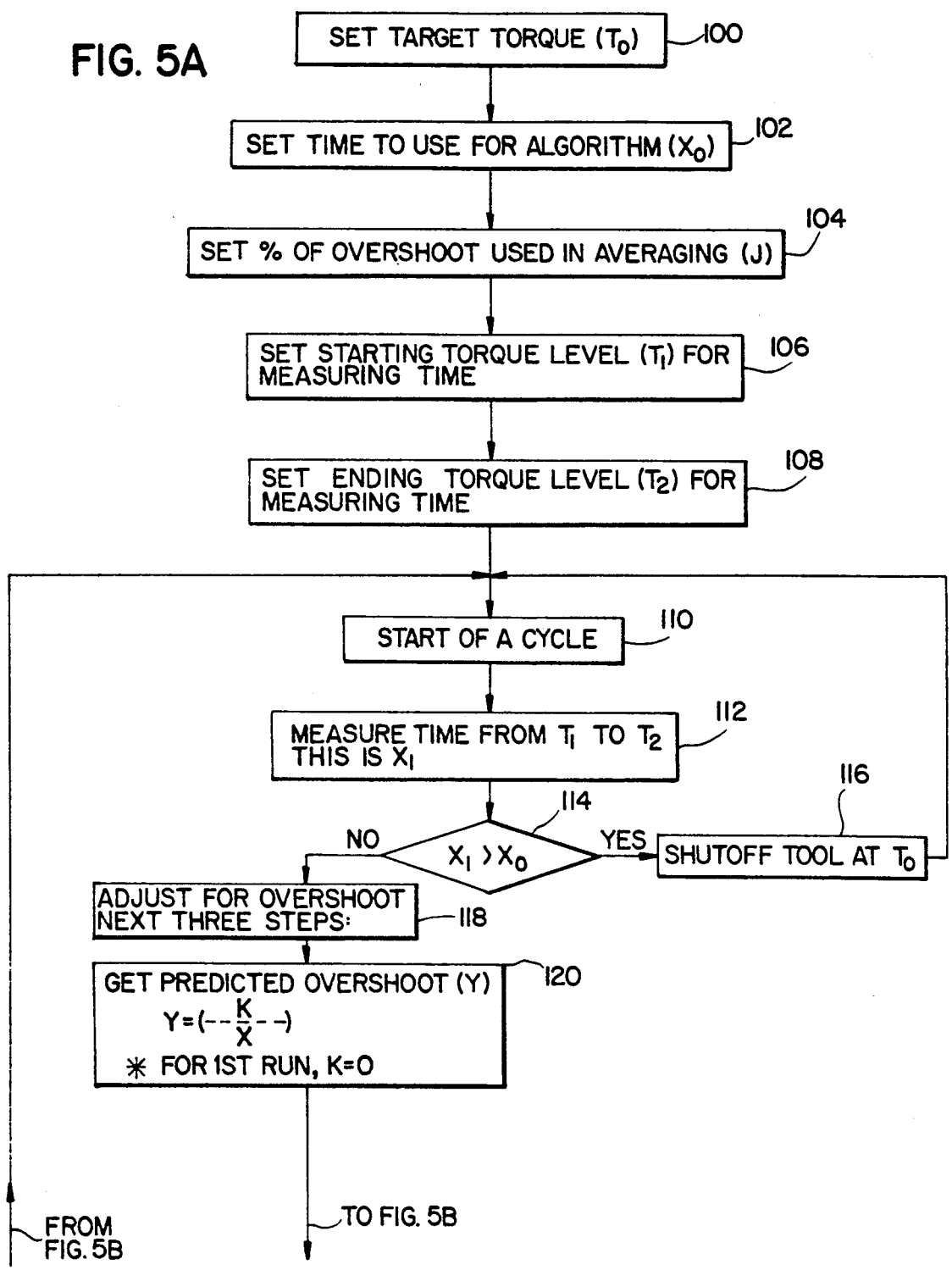
FIGS. 5A and 5B comprise a program flow chart illustrating this invention.
Figure 5B:
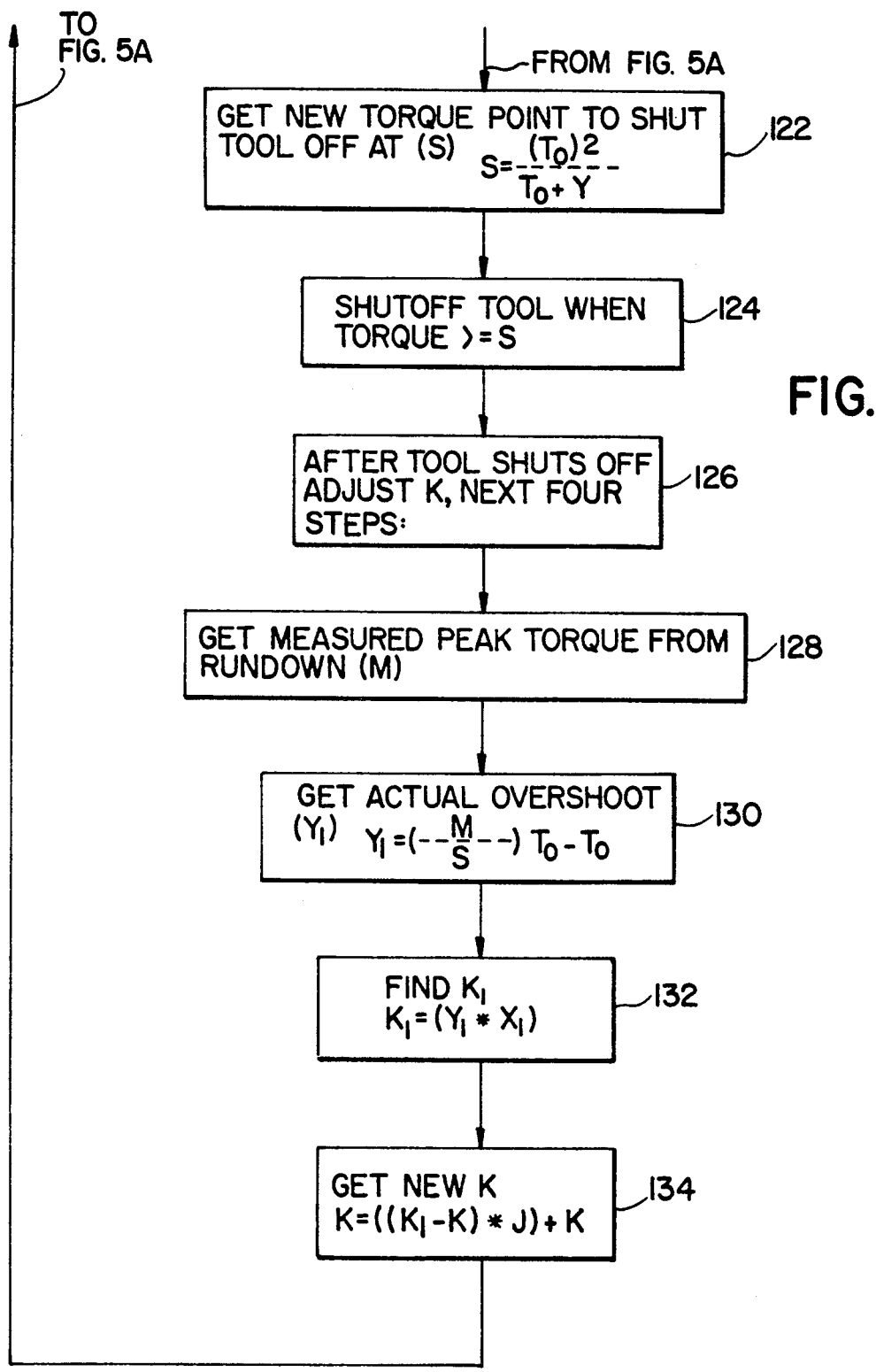

The foregoing is further illustrated in FIGS. 5A and 5B which comprise a flow chart of a program for carrying out this invention. The first five operations set various parameters used during the method. In particular, the target torque $T_o$ is set as indicated at 100, and operation 102 sets the time $X_o$ over which all readings are ignored, i.e., the next 30 ms time limit value given in the foregoing illustration. Next the % of overshoot, designated J in block 104, is set for use in the on-going averaging of K. This was the 15% factor indicated in the foregoing example. The remaining preliminary operations 106 and 108 set the selected fractional values of target torque, designated $T_1$ and $T_2$, between which the elapsed time is measured, i.e., the 25% and 75% of target torque used in the foregoing illustration.

Operation 110 represents the start of a cycle of the program during a fastening job and the first operation indicated 112 is to measure the elapsed time, designated $X_1$, between the selected fractional values of target torque $T_1$ and $T_2$. The measured elapsed time $X_1$ then is compared to the limit value $X_o$ in operation 114. If the measured elapsed time $X_1$ is greater than limit value $X_o$, i.e., greater than 30 ms according to the foregoing illustration, then overshoot compensation is not performed and the tool simply is shut off at the target torque $T_o$ as indicated by operation 116. Then the program simply returns to the starting point 110. On the other hand, if the measured elapsed time $X_1$ is less than limit value $X_o$ as determined during operation 114, then the program proceeds to adjust for overshoot as indicated in operation 118. In particular, operation 120 obtains the predicted overshoot Y using the relationship $Y = K/X$ as previously described wherein the value of the constant K would be available from a previous run. Operation 122 provides the new torque set point S at which to shut the tool off according to the relationship $$S = (T_o)^2/(T_o + Y)$$

as previously described wherein $T_o$ is the target torque set during operation 100 and Y is the predicted overshoot from operation 120. The tool is shut off when the torque exceeds the set point S as indicated in operation 124.

The remaining portion of the program provides a new value of the constant K for establishing the running average of K. This is done after the tool shuts off as indicated by operation 126. First, operation 128 gets the measured peak torque M from the previous run, this value having been measured and stored before the tool was shut off. Next, operation 130 calculates the actual overshoot Y, from the previous run according to the relationship $$Y_1 = (M/S)T_o - T_o$$

where M is the measured torque from operation 128, S is the torque set point from operation 122 and $T_o$ is the target torque set during operation 100. The following operation 132 finds the next value of K by multiplying the actual overshoot on the previous run by the measured time between selected fractional values of target torque during the previous run as described above. In particular, operation 132 finds $K_1$, the next value of K, according to the relationship $K_1 = (Y_1)(X_1)$ where $Y_1$ is the actual overshoot from the previous run provided by operation 130 and $X_1$ is the measured time provided by operation 112. Finally, operation 134 gets the new value of K, by subtracting the previous value of K from the next value of K, i.e., $K_1$, and applying the percent of overshoot to this difference and adding the result to the previous value of K. In particular, operation 134 finds $K_N$, the new value of K, according to the relationship $$K_N = ((K_1 - K)J) + K$$

where $K_1$ is the next value of K from operation 132, K is the previous value of K and J is the percent overshoot set by operation 104.

Upon conclusion of the foregoing, the program returns to the starting point 110 for a next cycle.

By way of example, in an illustrative system, the microprocessormeter 52 is commercially available from Stanley Air Tools, Cleveland, Ohio under the designation T701 and T702 and incorporates an Intel 8088 microprocessor and successors such as Intel 80286, 80386, 80486 etc. The program of FIGS. 5A and 5B is written in assembly language for performance on the illustrative microprocessor.

While the preferred embodiment of this invention, for simplicity and economy, uses torque-time rates, the present invention also includes within its scope the use of torque-angle rates. In this connection those skilled in the art will recognize that the term torque rate used in the foregoing description of FIGS. 1–5 describes both torque-angle and torque-time rates. The use of torque-angle rates is illustrated by the application of the present invention to electric tools previously mentioned. In particular, an electric tool operated by a DC brushless motor employs a resolver at the back of the motor which supplies a feedback signal to a servo-amplifier, an electronic switch which sends current successively to the multiple poles of the stator, poles which force and draw the permanent magnet rotor, making it spin. The resolver signal allows the servo-amplifier to execute an RPM program it contains in an optimal fashion, applying the switching to reach and maintain the set RPM. Such permanent-magnet rotor switched-pole DC motors, sometimes called pulsed DC or brushless DC, or EC motors, are used extensively in multiple spindle nutsetters, and in a few makes of portable tools. The resolver, an integral part of the driving system, is also used as an encoder, giving output spindle angle information of whatever resolution the gear train provides. Since angle information is readily available on such motors, the system and method of this invention is readily adaptable to such electric tools.

The foregoing description of FIGS. 1–5 equates angle with time. Accordingly, X is the deceleration time or angle required to tighten the fastener and K is a constant which is determined by using the measured deceleration time or angle and torque overshoot during a previous high torque-rate job. The deceleration time or angle is measured between selected fractional values of the target torque. Thus, in the flow chart of FIGS. 5A and 5B in blocks 102, 106, 108, 112 the quantity "time" would be replaced by the quantity "angle".

Figure 6:
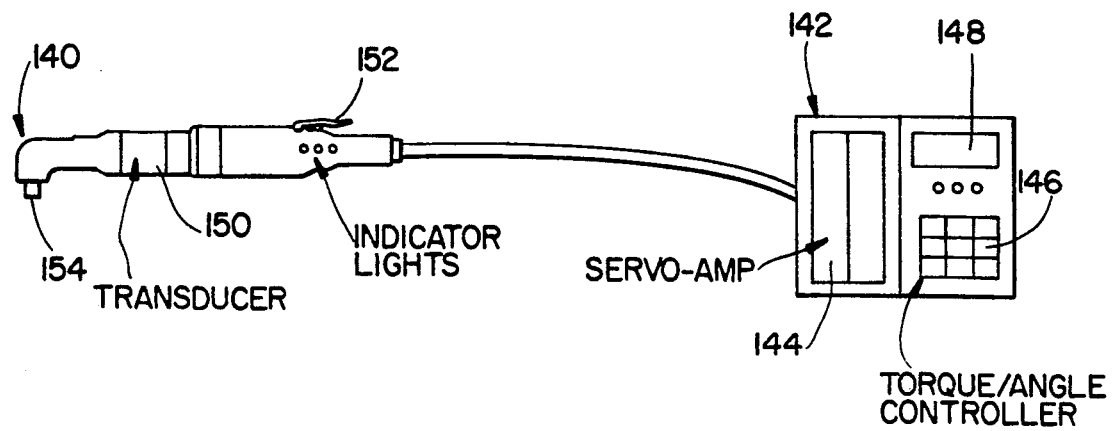
FIG. 6 is a schematic diagram illustrating an electrically operated power tool and controller utilizing the system and method according to this invention for compensating for torque overshoot.
Figure 7:
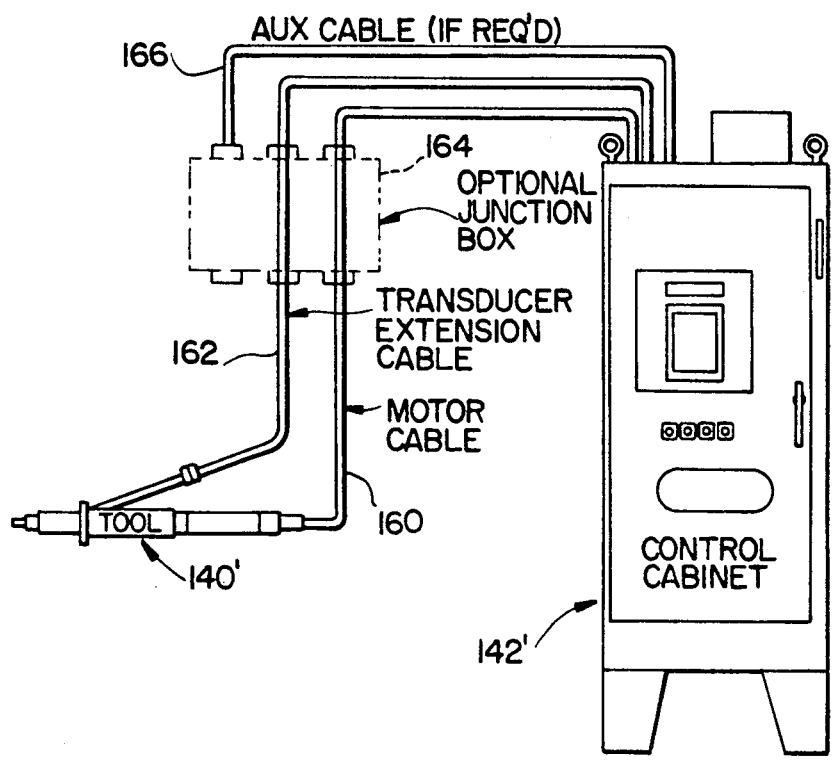
FIG. 7 is a schematic diagram further illustrating the tool and controller of FIG. 6.

An electric tool to which the present invention is applicable is illustrated in FIGS. 6 and 7. A pulsed DC electric tool 140 is connected to a control-meter combination 142 including a servo-amplifier 144, torque-angle controller 146 and meter 148. A torque-angle transducer 150 is incorporated in tool 140. Like tool 10 shown in FIG. 1, tool 140 has a manually-operated on-off switch 152 and an output drive shaft 154. In the more detailed illustration of FIG. 7, tool 140' is connected to control-meter 142' by a motor cable 160 and a transducer cable 162. The arrangement optionally can include an external junction box 164 and an auxiliary cable 166.

It is accordingly apparent that this invention accomplishes its intended objects. By virtue of the above described embodiment, a system and method is provided to compensate for torque overshoot which teaches the power tool control the dynamic character of the rotary power tool in use, in particular, finding the mathematical function which relates torque rate in the particular fastening job to overshoot in the tool. Inspection or monitoring the torque rate of a job is thus effected while the tool is actually setting the job so that the torque set point can be lowered in precisely the correct amount to compensate for the overshoot related to that torque rate. The system and method of this invention enables the tool to learn from actual fastening job runs and automatically adjust so that the tool itself observes the fastening event while it is happening and makes corrections to compensate for torque overshoot during a fastening job. The disclosed system and method, by establishing the running average of the constant K, accommodates random events in power fastening jobs. In requiring only the torque transducer-meter/microprocessor arrangement, the system and method of this invention is relatively simple in structure and readily adaptable to existing power tool arrangements. While the use of torque-time rates is preferred for simplicity and economy, the use of torque-angle rates is included within the scope of this invention.

While the disclosed embodiments of the present invention have been described in detail, that has been for the purpose of illustration, not limitation.

I claim:
1. A method for compensating for torque overshoot in a rotary power tool wherein the tool is to be shut off at a target torque and is actually shut off at a torque set point equal to or less than the target torque depending upon the amount of torque overshoot, said method comprising the steps of:
   (a) operating the tool to perform a high torque rate fastening job;
   (b) measuring time duration between selected fractions of the target torque which occur during a portion of the fastening job when the torque rate is linear to provide a fastener deceleration time value;
   (c) measuring the torque overshoot in the job;
   (d) calculating a value of K from an expression K=XY where Y is torque overshoot and X is deceleration time required to tighten the fastener;

(e) operating the tool to perform a next fastening job;
(f) measuring the time duration between the same selected fractions of target torque as in the first measuring step to obtain a deceleration time for said next fastening job;
(g) determining the torque overshoot for said next fastening job from the expression $Y = K/X$ using the value of K previously determined and a value of X measured during said next fastening job; and
(h) adjusting the torque set point to compensate for the calculated value of overshoot.

2. The method of claim 1, further including determining the value of K from job-to-job to perform an ongoing averaging of K.

3. A method according to claim 1, wherein said tool is fluid operated.

4. A method according to claim 1, wherein said tool is electrically operated.

5. A method for compensating for torque overshoot in a rotary power tool wherein the tool is to be shut off at a target torque and is actually shut off at a torque set point equal to or less than the target torque depending upon the amount of torque overshoot, said method comprising the steps of:
(a) operating the tool to perform a first fastening job;
(b) measuring time duration between selected fractions of the target torque which occur during a portion of the fastening job when the torque rate is linear to provide a fastener deceleration time value;
(c) determining the torque overshoot by subtracting the measured torque at the end of the fastening job from the target torque;
(d) calculating a value of K from an expression $K = XY$ where Y is torque overshoot and X is deceleration time required to tighten the fastener;
(e) operating the tool to perform a second fastening job;
(f) measuring the time duration between the same selected fractions of target torque as in the first measuring step to obtain a deceleration time for said second fastening job;
(g) determining torque overshoot for said second fastening job from an expression $Y = K/X$ using the value of K determined during said first fastening job and the deceleration time obtained during said second fastening job;
(h) determining a new torque set point according to a relationship $$S = [(Target)/(Target + Y)](Target)$$

where S is the new set point, Target is the target torque and Y is the torque overshoot determined for the second fastening job; and
(i) establishing a running average of the constant K.

6. A method according to claim 5, wherein said step of establishing a running average of the constant K comprises:
(a) calculating actual overshoot on a previous fastening job;
(b) calculating the next value of the constant K; and
(c) subtracting the next value of K from the previous value of K and adding a fraction of the difference to the previous value of K to obtain a new value of K.

7. A method according to claim 6 further including:
(a) operating the tool to perform a third fastening job;
(b) measuring the time duration between the same selected fractions of target torque to obtain a deceleration time for said third fastening job;
(c) determining the torque overshoot for said third fastening job from the expression $Y = K/X$ using said new value of K and the deceleration time obtained during said third fastening job; and
(d) determining a new torque set point according to the relationship $$S = [(Target)/(Target) + Y](Target)$$

where S is the new set point, Target is the target torque and Y is the torque overshoot determined for the third fastening job.

8. A method according to claim 7 further including obtaining a new value of the constant K by:
(a) calculating actual overshoot on a previous fastening job;
(b) calculating the next value of the constant K; and
(c) subtracting the next value of K from the previous value of K and adding a fraction of the difference to the previous value of K to obtain a new value of K.

9. A method according to claim 8, wherein said step of obtaining a new value of the constant K comprises:
(a) calculating the actual overshoot on a previous fastening job $Y_a$ according to the relationship $$Y_a = (M/S)(Target) - Target$$

where M is the measured torque at the end of the fastening job, S is the set point torque and Target is the target torque;
(b) calculating the next value of the constant K according to the relationship $K_1 = Y_a X$ where $K_1$ is the next value of K, $Y_a$ is the calculated actual overshoot on a previous fastening job and X is the measured deceleration time on the previous fastening job; and
(c) subtracting the next value of K from the previous value of K and adding about 15% of the difference to the previous value of K to obtain a new value of K.

10. A method according to claim 5, wherein said step of establishing a running average of the constant K comprises:
(a) calculating actual overshoot on a previous fastening job $Y_a$ according to the relationship $$Y_a = (M/S)(Target) - Target$$

where M is the measured torque at the end of the fastening job, S is the set point torque and Target is the target torque;
(b) calculating the next value of the constant K according to the relationship $K_1 = Y_a X$ where $K_1$ is the next value of K, $Y_a$ is the calculated actual overshoot on a previous fastening job and X is the measured deceleration time on the previous fastening job; and
(c) substracting the next value of K from the previous value of K and adding about 15% of the difference to the previous value of K to obtain a new value of K.

11. A method according to claim 5 wherein said steps of measuring the time duration between selected fractions of target torque during the first fastening job and the second fastening job each includes determining if the measured time duration is greater than a predetermined value and, if so, preventing compensation for overshoot.

12. A method according to claim 5, wherein said tool is fluid operated.

13. A method according to claim 5, wherein said tool is electrically operated.

14. A method for compensating for torque overshoot in a power tool wherein the tool is to be shut off at a target torque and is actually shut of at a torque set point equal to or less than the target torque depending upon the amount of torque overshoot, said method comprising the steps of:
   (a) operating the tool to perform a high torque rate fastening job;
   (b) measuring torque angle between selected fractions of the target torque which occur during a portion of the fastening job when the torque rate is linear to provide a fastener deceleration angle value;
   (c) measuring the torque overshoot on the job;
   (d) calculating a value of K from an expression $K=XY$ where Y is torque overshoot and X is a deceleration angle required to tighten the fastener;
   (e) operating the tool to perform a next fastening job;
   (f) measuring the torque angle between the same selected fractions of target torque as in the first measuring step to obtain a deceleration angle for said next fastening job;
   (g) determining the torque overshoot for said next fastening job from the expression $Y=K/X$ using the value of K previously determined and a value of X measured during said next fastening job; and
   (h) adjusting the torque set point to compensate for the calculated valve of overshoot.

15. The method of claim 14, further including determining the value of K from job-to-job to perform an on-going averaging of K.

16. A system for compensating for torque overshoot in a rotary power tool including control means to normally shut off the tool at a target torque and to actually shut off the tool at a torque set point equal to or less than the target torque depending upon the amount of torque overshoot, said system comprising:
   (a) torque measuring means operatively associated with said tool for providing an output indicative of the torque of said tool;
   (b) processor means having an input operatively connected to said torque measuring means and having an output operatively connected to said control means; and
   (c) said processor means including means for computing deceleration time between selected fractional values of the target torque, means for computing the torque overshoot, means operatively connected to said means for computing deceleration time and to said means for computing overshoot for computing a constant K in a relationship $K=XY$ where Y is computer overshoot and X is computer deceleration time, the constant K being determined by using values of overshoot and deceleration time during a previous high torque-rate application of said tool, and means connected to said means for computing K and to said means for computing deceleration time for computing overshoot according to the relationship $Y=K/X$ so that the output of said means for computing overshoot is used for adjusting the torque set point via said control means to compensate for the computed value of torque overshoot.

17. A system according to claim 16, wherein said tool is fluid operated.

18. A method for compensating for torque overshoot in a rotary power tool wherein the tool is to be shut off at a target torque and is actually shut off at a torque set point equal to or less than the target torque depending upon the amount of torque overshoot, said method comprising the steps of:
   (a) operating the tool to perform a fastening job;
   (b) determining a relationship between torque rate in the fastening job to overshoot in the tool while the tool is performing the job;
   (c) monitoring the torque rate in the job while the tool is setting the job;
   (d) measuring deceleration time and torque overshoot during the job, said deceleration time being measured between selected fractional values of the target torque;
   (e) adjusting the torque set point while the tool is setting the job to compensate for overshoot related to the torque rate according to said relationship between torque rate and overshoot;
   (f) said relationship between torque rate in the fastening job to overshoot in the tool following the mathematical expression $Y=K/X$ where Y is overshoot, X is deceleration time required to tighten the fastener and K is a constant which is determined by using the measured deceleration time and torque overshoot during a previous fastening job in said expression; and
   (g) during a subsequent fastening job, measuring deceleration time between the same selected fractional values of target torque of a previous high torque-rate job, calculating overshoot from the foregoing mathematical expression using the previously determined value of K, and adjusting the torque set point to compensate for the calculated value of overshoot.

19. The method of claim 18, further including determining the value of K from job-to-job to perform an on-going averaging of K.

20. The method according to claim 19, wherein said tool is fluid operated.

21. The method according to claim 18, wherein said tool is electrically operated.

22. A method for compensating for torque overshoot in a rotary power tool wherein the tool is to be shut off at a target torque and is actually shut off at a torque set point equal to or less than the target torque depending upon the amount of torque overshoot, said method comprising the steps of:
   (a) operating the tool to perform a fastening job;
   (b) determining a relationship between torque rate in the fastening job to overshoot in the tool while the tool is performing the job;
   (c) monitoring the torque rate in the job while the tool is setting the job;
   (d) measuring deceleration angle and torque overshoot during the job, said deceleration angle being measured between selected fractional values of the target torque;
   (e) adjusting the torque set pint while the tool is setting the job to compensate for overshoot related to the torque rate according to said relationship between torque rate and overshoot;

(f) said relationship between torque rate in the fastening job to overshoot in the tool following the mathematical expression $Y = K/X$ where Y is overshoot, X is deceleration angle required to tighten the fastener and K is a constant which is determined by using the measured deceleration angle and torque overshoot during a previous fastening job in said expression; and (g) during a subsequent fastening job, measuring deceleration angle between the same selected fractional values of target torque of a previous high torque-rate job, calculating overshoot from the foregoing mathematical expression using the previously determined value of K, and adjusting the torque set point to compensate for the calculated value of overshoot.

23. The method of claim 20, further including determining the value of K from job-to-job to perform an on-going averaging of K.

* * * * *